US009083434B2

(12) United States Patent
Gunnarsson et al.

(10) Patent No.: US 9,083,434 B2
(45) Date of Patent: Jul. 14, 2015

(54) SYSTEM AND METHOD FOR OPERATING A REPEATER

(75) Inventors: Fredrik Gunnarsson, Linköping (SE); Pål Frenger, Linköping (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 622 days.

(21) Appl. No.: 13/238,769

(22) Filed: Sep. 21, 2011

(65) Prior Publication Data

US 2013/0072112 A1    Mar. 21, 2013

(51) Int. Cl.
*H04W 4/00* (2009.01)
*H04B 7/26* (2006.01)

(52) U.S. Cl.
CPC ................... *H04B 7/2606* (2013.01)

(58) Field of Classification Search
CPC .... H04B 7/155; H04B 72/0466; H04B 17/02; H04B 1/76; H04B 7/2606; H04B 72/087; H04B 72/02; H04B 72/0453; H04B 7/1542; H04B 7/15535; H04B 52/46; H04B 88/04; H04B 84/047
USPC ......... 455/7, 9, 11.1, 552.1, 115.1, 15, 456.1; 370/241, 328, 216, 252, 329, 315; 375/130, 211
See application file for complete search history.

(56) References Cited

U.S. PATENT DOCUMENTS

| 6,853,631 | B1* | 2/2005 | Nakamura et al. ............ 370/342 |
| 7,088,953 | B2* | 8/2006 | Bongfeldt ....................... 455/24 |
| 2002/0044594 | A1* | 4/2002 | Bongfeldt ...................... 375/213 |
| 2002/0045431 | A1* | 4/2002 | Bongfeldt .................. 455/234.1 |
| 2002/0053925 | A1* | 5/2002 | Anderson et al. ............... 326/82 |
| 2005/0153653 | A1* | 7/2005 | Diao et al. .................... 455/11.1 |
| 2006/0189353 | A1* | 8/2006 | Fujishima ..................... 455/561 |
| 2008/0107078 | A1* | 5/2008 | Viorel et al. .................. 370/331 |
| 2008/0112365 | A1* | 5/2008 | Kwun et al. .................. 370/332 |
| 2009/0011700 | A1 | 1/2009 | Nishio et al. |
| 2009/0129442 | A1* | 5/2009 | Mohebbi et al. .............. 375/130 |
| 2009/0163224 | A1* | 6/2009 | Dean et al. .................. 455/456.1 |
| 2010/0034132 | A1* | 2/2010 | Robertson et al. ............ 370/315 |
| 2010/0093354 | A1* | 4/2010 | Agashe et al. ................ 455/436 |
| 2010/0265842 | A1* | 10/2010 | Khandekar et al. ........... 370/252 |
| 2010/0284445 | A1* | 11/2010 | Barriac et al. ................ 375/211 |
| 2010/0323684 | A1* | 12/2010 | Cai et al. .................... 455/422.1 |
| 2011/0009052 | A1* | 1/2011 | Horiuchi et al. .................. 455/7 |
| 2011/0053602 | A1 | 3/2011 | Moberg et al. |

(Continued)

OTHER PUBLICATIONS

U.S. Appl. No. 13/238,509, filed Sep. 21, 2011, Fredrik Gunnarsson.

(Continued)

*Primary Examiner* — Tan Trinh

(57) ABSTRACT

A method of operating a repeater for wireless communication includes broadcasting, from the repeater, a pilot signal in a service area associated with the repeater. The pilot signal carries a scrambling code that permits mobile terminals to decode information transmitted by the repeater. The method further includes receiving a request to initiate communication from a mobile terminal that has received the pilot signal and, in response to receiving the request, establishing a communication link with the mobile terminal. The method further includes receiving, at a first antenna of the repeater, data transmitted wirelessly by the mobile terminal and transmitting, over a second antenna of the repeater, the received data to a base station.

15 Claims, 5 Drawing Sheets

(56) References Cited

U.S. PATENT DOCUMENTS

| | | | |
|---|---|---|---|
| 2011/0217985 A1* | 9/2011 | Gorokhov | 455/452.2 |
| 2011/0256891 A1* | 10/2011 | Soliman et al. | 455/458 |
| 2011/0306334 A1 | 12/2011 | Brunel et al. | |
| 2012/0033571 A1* | 2/2012 | Shimezawa et al. | 370/252 |
| 2013/0010604 A1* | 1/2013 | Zhang et al. | 370/241 |
| 2013/0010681 A1* | 1/2013 | Xu et al. | 370/315 |
| 2013/0010694 A1* | 1/2013 | Yu et al. | 370/328 |
| 2013/0010697 A1* | 1/2013 | Zhang et al. | 370/328 |
| 2013/0010748 A1* | 1/2013 | Novak et al. | 370/330 |
| 2013/0021986 A1* | 1/2013 | Bhattad et al. | 370/329 |
| 2013/0028122 A1* | 1/2013 | Ma et al. | 370/252 |
| 2013/0070583 A1* | 3/2013 | Xu et al. | 370/216 |
| 2013/0079020 A1* | 3/2013 | Shahid et al. | 455/444 |
| 2014/0233502 A1* | 8/2014 | Fong et al. | 370/329 |

OTHER PUBLICATIONS

U.S. Appl. No. 13/238,597, filed Sep. 21, 2011, Fredrik Gunnarsson.

3GPP. 3rd Generation Partnership Project; Technical Specification Group Core Network and Terminals; Non-Access-Stratum (NAS) Protocol for Evolved Packet System (EPS): Stage 3 (Release 10). 3GPP TS 24.301 V10.3.0 (Jun. 2011).

3GPP. 3rd Generation Partnership Project; Technical Specification Group Radio Access Network: Radio Resource Control (RRC): Protocol Specification (Release 10). 3GPP TS 25.331 V10.4.0 (Jun. 2011).

3GPP. 3rd Generation Partnership Project; Technical Specification Group Radio Access Network; UTRAN Function, Examples on Signalling Procedures (Release 10). 3GPPP TR 25.931 V10.1.0 (Jun. 2011).

3rd Generation Partnership Project;Technical Specification Group Radio Access Network; Physical channels and mapping of transport channelsonto physical channels (FDD) (Release 9), Sep. 2010.

Bahl, Sanat Kamal. "Cell searching in WCDMA." Potentials, IEEE 22, No. 2 (2003): 16-19.

3rd Generation Partnership Project;Technical Specification Group Radio Access Network; Evolved Universal Terrestrial Radio Access (E-UTRA);Physical channels and modulation (Release 10), Dec. 2010.

* cited by examiner

SYSTEM AND METHOD FOR OPERATING A REPEATER

TECHNICAL FIELD OF THE INVENTION

This disclosure relates in general to wireless communication and, more particularly, to a repeater for facilitating communication between a mobile terminal and a radio access network.

BACKGROUND OF THE INVENTION

A goal of mobile broadband is to offer seamless wireless communication services essentially everywhere. Macro cell deployments often provide acceptable service coverage, while some areas such as important and/or very populated buildings are subject to dedicated solutions. However, in some other areas, macro coverage is insufficient, and it is not economically viable to consider dedicated deployments. Examples include underground garages, tunnels, and apartment buildings.

One appealing solution in such cases is to deploy repeaters. A repeater receives radio signals at one antenna and forwards the received signal over another, possibly after some amplification. Repeaters (amplifies and) forwards both the signals and noise, which may have a negative impact on the donor cell. All received signals at the pick-up antenna are repeated—no knowledge about the communication protocols is needed. Furthermore, the donor cell and base station may be unaware that the link is via a repeater.

However, if not properly managed, repeaters can waste significant amounts of energy and unnecessarily interfere with the communication of nearby devices, such as base station and mobile terminals. In particular, if operating when no or few mobile devices need their services, repeaters can have a negative impact on overall system operation. But, given that the mobile communication system may have no or incomplete knowledge of where repeaters are installed and no dedicated communication link with the repeaters, discovering and effectively managing repeaters can be difficult.

SUMMARY OF THE INVENTION

In accordance with the present disclosure, certain disadvantages and problems associated with mobile communication have been substantially reduced or eliminated. In particular, certain devices and techniques for repeating wireless transmissions are described.

In accordance with a particular embodiment of the present disclosure, a method of operating a repeater for wireless communication includes broadcasting, from the repeater, a pilot signal in a service area associated with the repeater. The pilot signal carries a scrambling code that permits mobile devices to decode information transmitted by the repeater. The method further includes receiving a request to initiate communication from a mobile terminal that has received the pilot signal and, in response to receiving the request, establishing a communication link with the mobile terminal. The method further includes receiving, at a first antenna of the repeater, data transmitted wirelessly by the mobile terminal and transmitting, over a second antenna of the repeater, the received data to a base station.

In accordance with another embodiment of the present invention, a method of managing a repeater includes receiving, from one or more wireless terminals, information indicating that the wireless terminals detect a pilot signal broadcast by the repeater. The method further includes determining, based on the information, that a change in the number of wireless terminals detecting the pilot signal has occurred, and in response to determining that the change has occurred, transmitting configuration information to the repeater.

Important technical advantages of certain embodiments of the present invention include improved techniques for discovering and managing repeaters, selecting appropriate repeater resources, and optimizing the activation and deactivation of repeaters. Particular embodiments may be capable of remotely configuring repeaters based on the current need for their services. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
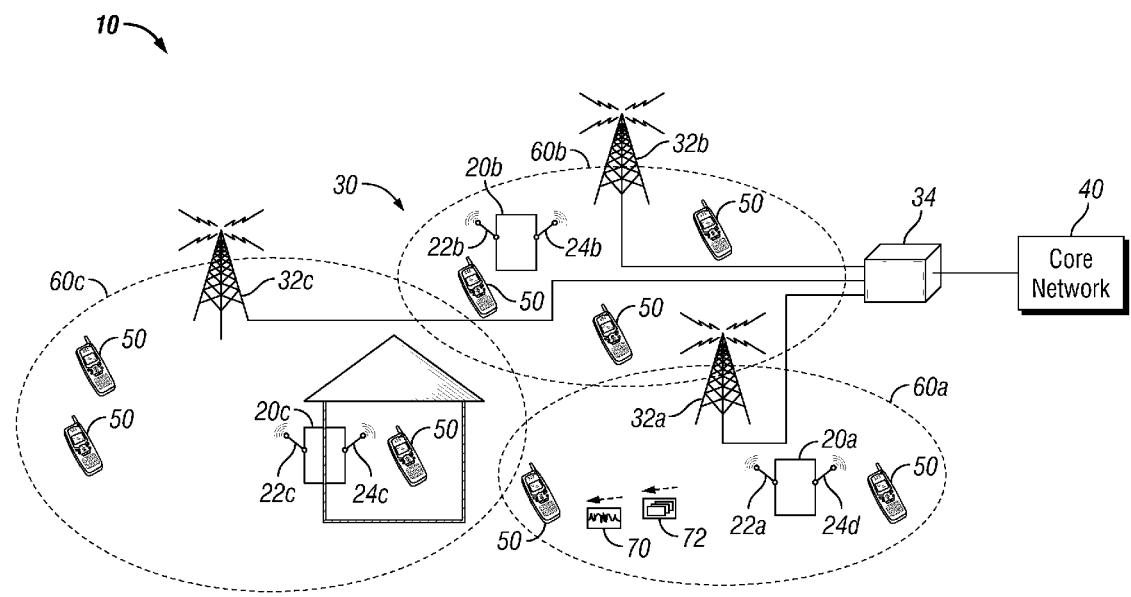
FIG. 1 illustrates a mobile communication system that includes a repeater capable of repeating transmissions received from mobile devices and/or an access network of the mobile communication system.

FIG. 1 illustrates a mobile communication system 10 that provides communication service to a plurality of mobile devices 50. Mobile communication system 10 includes an access network 30 that serves a plurality of cells 60 associated with mobile communication system 10 and a core network 40 that provides backhaul delivery of information within mobile communication system 10. To increase the coverage or capacity of access network 30, mobile communication system 10 also contains one or more repeaters 20 that repeat radiofrequency signals received from mobile devices 50. However, activating or leaving repeaters 20 operational when no mobile devices 50 require their assistance can unnecessarily waste energy and interfere with mobile devices 50 whose signals are not being repeated. As a result, particular embodiments of mobile communication system 10 provide improved techniques for configuring and managing the operation and use of repeaters 20.

In general, mobile communication system 10 provides mobile communication service to mobile devices 50 operating within a geographic area associated with mobile communication system 10. Mobile communication system 10 is capable of communicating information between a mobile device 50 and other mobile devices 50 or between a mobile device 50 and other communication devices, such as landline telephones connected to mobile communication system 10. Mobile communication system 10 may support the communication of any suitable type of information in accordance with any appropriate communication standards. For example, mobile communication system 10 may represent a Global System for Mobile Communications (GSM) network, a Wideband Code Division Multiple Access (WCDMA) network, an Long Term Evolution (LTE) communication network, or a network configured to communicate in accordance with any other suitable standard.

Repeaters 20 receive and forward information transmitted wirelessly between mobile devices 50 and access network 30. Repeaters 20 each include two or more antennas, and signals received on one antenna of a repeater 20 are repeated on another antenna. Repeaters 20 may also amplify received signals based on gains configured for repeaters 20 before or during operation. In particular embodiments, repeaters 20 repeat information transmitted by access network 30 and mobile devices 50, as well as received noise, without decoding the received signals.

Repeaters 20 may each represent any appropriate combination of hardware and/or software suitable to provide the described functionality. The contents of an example embodiment of repeater 20 are illustrated in greater below with respect to FIG. 3. In particular embodiments, repeaters 20 may include a terminal module, or otherwise support certain mobile terminal functionality, permitting repeaters 20 to communicate with access network 30 in a similar or identical fashion to that with which mobile devices 50 communicate with access network 30. For example, in particular embodiments, repeaters 20 can establish a signaling connection to an appropriate node of access network 30 (e.g., a radio control node) via Radio Resource Control (RRC) signaling in a similar manner to mobile devices 50.

Access network 30 communicates wirelessly with mobile devices 50 and serves as an interface between mobile devices 50 and core network 40. Access network 30 may represent or include any elements responsible for radio transmissions or for control of radio connections with mobile devices 50. Access network 30 may represent or include a radio access network and/or any elements responsible for providing a radio or air interface for core network 40. For example, in the illustrated embodiment, access network 30 represents a WCDMA access network 30 that includes base stations 32 and radio network controller 34.

Base stations 32 communicate wirelessly with mobile devices 50 to support mobile communication for mobile devices 50. Base stations 32 may include any appropriate elements to communicate with mobile devices 50 and to interface mobile devices 50 with core network 40. For example, depending on the communications standards supported by access network 30 and core network 40, each base station 32 may represent or include a conventional base station, a Node B, an evolved Node B (eNodeB), a radio base station (RBS), or any other suitable element capable of communicating with mobile devices 50 wirelessly.

Radio network controller 34 controls the operation of base stations 32 and interacts with appropriate elements of core network 40. Radio network controller 34 may include any appropriate elements to manage the operation of base stations 32. In particular embodiments, radio network controller 34 may be responsible for managing radio channels used by base stations 32, managing handoffs between base stations 32, concentrating communication channels transmitted by base stations 32, and/or otherwise managing the operation and interoperation of base stations 32 and interfacing base stations 32 with core network 40. For example, depending on the communications standards supported by access network 30 and core network 40, radio network controller 34 may represent or include a base station controller (BSC), a radio network controller (RNC), or any other suitable collection of hardware and/or software appropriate for controlling base stations 32. Depending on the configuration of a particular embodiment of mobile communication system 10, radio network controller 34 may be omitted from mobile communication system 10, or radio network controller 34 may represent components integrated with or functionality provided by based stations 32. Additionally, although FIG. 1 shows, for the sake of simplicity only a single radio network controller 34, mobile communication system 10 may include any suitable number of radio network controllers 34 each responsible for managing a particular set of base stations 32.

Core network 40 routes voice and/or data communicated by mobile devices 50 from access network 30 to other mobile devices 50 or to other communication devices coupled to core network 40 through landline connections or through other networks. In particular embodiments, core network 40 may include a backbone network and any backhaul elements connecting access network 30 to the backbone network. Core network 40 may support any appropriate standards or techniques for routing such communications. For example, in particular embodiments of mobile communication system 10, core network 40 may represent a Mobile Application Part (MAP) core network. Additionally, core network 40 may also be responsible for aggregating communication for longhaul transmission, authenticating users, manage user mobility, providing call control, billing, or other functionality associated with providing communication services to mobile devices 50.

Mobile devices 50 provide voice, data, and/or multimedia communication service for users via wireless connections with mobile communication system 10. Mobile devices 50 may represent any appropriate devices capable of wireless communications including, but not limited to, cellular telephones, portable digital assistants (PDAs), laptop or tablet computers, and network-enabled media players. In embodiments of mobile communication system 10 that support 3rd Generation (3G) communication technologies, mobile devices 50 may each represent user equipment (UE) or other types of terminals.

In operation, mobile communication system 10 provides telecommunication service to mobile devices 50. As part of this service, access network 30 communicates wirelessly with mobile devices 50. For example, in the illustrated embodiment, base stations 32 of access network 30 establish wireless connections with mobile devices 50 for communication over radiofrequency (RF) channels, and radio network controller 34 governs use of available RF channels, manage mobility of mobile devices 50, and otherwise control operation of base stations 32. Meanwhile, core network 40 transports voice, data, multimedia, and/or other types of information between various components of access network 30 and between other elements of mobile communication system 10, such as wireline communication devices.

Radio coverage in a cell 60 is provided by a base station 32 associated with that cell 60. There may be more than one cell 60 covering the same geographical area. The base station 32 associated with a particular cell 60 broadcasts a locally unique scrambling code that is used by mobile devices 50 to identify base stations 32 from which signals are being received. Thus, the geographical area corresponding to a cell 60 can be defined as the area where the scrambling code associated with that cell 60 is the strongest scrambling code received.

Mobile devices 50 monitor the radio quality of signals received from base stations 32 in surrounding cells 60. Based on measurements made by a mobile device 50, information maintained by radio network controller 34 about the cell 60 in which a particular mobile device 50 is operating, and/or any other suitable considerations, mobile communication system 10 associates various different groups of base stations 32 with the mobile device 50. These groups each include one or more base stations 32 and may be generated by radio network controller 34, the mobile device 50, or other appropriate components of mobile communication system 10. These groups of base stations 32 are then used to determine appropriate candidates for providing service to the relevant mobile device 50.

For example, in particular embodiments, a mobile device 50 (for purposes of illustration mobile device 50a of FIG. 1) will maintain a list of the base stations 32 to which mobile device 50a is currently connected and/or the base stations 32 which are currently assigning a downlink channel to mobile device 50a. This group of base stations 32 is referred to as the mobile device's "active set." Radio network controller 34 may determine a number of base stations in neighboring cells 60 for which mobile device 50a should report signal strength. These base stations represent the mobile device's "monitored set." Radio network controller 34 may transmit scrambling codes or other information to permit mobile device 50a to detect the base stations 32 in its monitored set. Additionally, other base stations 32 that mobile device 50a detects and/or from which mobile device 50a receives signals that satisfy certain criteria (e.g., a minimum signal strength) are referred to as the mobile device's "detected set." The detected set may include base stations 32 that radio network controller 34 is unfamiliar with, for which radio network controller 34 stores no info (e.g., base stations 32 for another providers network), and/or base stations 32 that radio network controller 34 does not consider to be in cells 60 neighboring mobile device 50a.

To facilitate creation and maintenance of these various sets, a mobile device 50 may perform measurements of signals that mobile device 50 receives from nearby base stations 32. Radio network controller 34 may use measurement control messages to configure mobile devices 50 to perform and report measurements of the current radio quality for nearby base stations 32. These measurement control messages may provide information about the base stations 32 for which the receiving mobile device should perform measurements, provide information permitting the mobile device 50 to measure or otherwise communicate with the relevant base stations 32, identify the type of measurement to be performed, or other information indicating to the relevant mobile device 50 the desired measurements. For example, in particular embodiments, radio network controller 34 sends a measurement control message that includes the scrambling codes for the base stations 32 in a mobile device's monitored set and indicates a type of measurement (e.g., Received Signal Code Power (RSCP), Received Signal Strength Indicator (RSSI), path loss (Ec/N0)). Radio network controller 34 may configure mobile devices 50 to monitor specific signals (e.g., a Physical Common Pilot Channel (PCPICH)) transmitted by a particular set of base stations 32 or all signals received from those base stations 32.

In particular embodiments, radio network controller 34 may use measurement control messages to configure mobile devices 50 for event-triggered measurement reporting. For example, in certain embodiments, radio network controller 34 configures mobile device 50a with a reporting range that is defined to include cells 60 mobile device 50a is detecting with a signal strength or quality that is within a certain threshold of the strength or quality of the best cell mobile device 50a is currently detecting. Radio network controller 34 may then configure mobile device 50a to report to radio network controller 34 whenever a new cell enters its reporting range, whenever a cell has left its reporting range, whenever one cell replaces another within its reporting range, whenever the best cell detected by mobile device 50a changes, or whenever any combination of these events occurs. Mobile device 50a may transmit a report to radio network controller 34 whenever one of the described events occurs, notifying radio network controller 34 of the event and the relevant cell 60: If the base station 32 about which the reporting mobile device 50 is reporting happens to be part of a closed subscriber group (e.g. a home base station), the reporting mobile device 50 may include a unique cell identifier for the relevant base station 32 that permits radio network controller 34 to uniquely identify the specific base station 32 to which the reported measurements relate. Radio network controller 34 may then use the measurements to make appropriate changes to the base station 32 or base stations 32 serving the reporting mobile device 50.

To increase coverage and/or throughput of access network 30, certain cells 60 of mobile communication system 10 include one or more repeaters 20 in addition to base stations 32. When activated, repeaters 20 forward transmissions received from mobile devices 50 to appropriate elements of access network 30 (e.g., base stations 32 in the illustrated embodiment). Repeaters 20 may also be configured to amplify repeated signals to further increase their signal strength as received at their intended destination.

In order to permit mobile devices 50 and/or radio network controller 34 to distinguish between the various repeaters 20 operating in mobile communication system 10 and to allow mobile devices 50 to perform signal measurements, repeaters 20 may each broadcast a unique pilot signal 70 when active. For example, in particular embodiments, each repeater 20 may be configured to transmit a physical common pilot channel (PCPICH) signal. Pilot signals 70 may represent any appropriate information detectable by mobile devices. In particular embodiments, pilot signals 70 each represent a fixed bit sequence that is encoded using a scrambling code that is unique (within mobile communication system 10) to the relevant repeater 20 and that can be used by mobile devices 50 to decode information transmitted by the corresponding repeater 20.

Repeaters 20 may also broadcast system information 72 that describes mobile communication system 10 and/or the cell in which a repeater 20 is operating. System information 72 may represent or include any appropriate information that permits mobile devices 50 to initiate communication with the corresponding repeater 20. For example, in particular embodiments, repeaters 20 transmit a broadcast channel (BCH) that carries system information blocks (SIBs) for use by mobile devices 50. Examples of this system information 72 include, but are not limited to, a system frame number (SFN); cell identity information; core network domain information (e.g., domain identifiers, domain-specific non-access stratum (NAS) information, location area codes (LACs), routing area codes (RACs)); cell selection and reselection parameters (e.g., minimum quality requirements, reselection thresholds, reselection timers, and maximum uplink transmit power); and various power control constraints. System information 72 may also include accessibility information such as allowed Public Land Mobile Network identities or an indication of whether the relevant repeater 20 is accepting traffic or not.

When mobile device 50a receives a pilot signal 70 broadcast by one of repeaters 20, mobile device 50a may report the received pilot signal 70 to radio network controller 34 (e.g., as part of the mobile device's detected set). In particular embodiments, radio network controller 34 stores a scrambling code for each repeater 20 served by radio network controller 34. In such embodiments, mobile device 50a may transmit information indicating scrambling codes received by the mobile device 50 (as part of a repeater's pilot signal 70) to radio network controller 34. Radio network controller 34 may maintain a list of scrambling codes for all known repeaters 20 and, based on scrambling codes received from a particular mobile device 50, may be able to determine which repeaters 20 that mobile device has detected. As a result, in particular embodiments, repeaters 20 can be discovered by mobile devices 50 in a similar or identical fashion to base stations 32.

Depending on the configuration of mobile communication system 10, radio network controller 34 may additionally or alternatively maintain information about the location of repeaters 20. This location information may describe the location of a repeater 20 in absolute terms, relative to another component of mobile communication system 10 (such as a serving base station 32 or a cell 60 associated with the repeater 20), or in any other suitable manner. In particular embodiments, when a mobile device 50 enters a new cell 60, radio network controller 34 may transmit information about repeaters 20 located nearby to mobile device 50a (e.g., as part of the mobile device's monitored set). Thus, in particular embodiments, radio network controller 34 and mobile devices 50a may be capable of exchanging information about the location, status, and relative effectiveness of repeaters 20. This exchange of information may permit the discovery and selection of an optimal repeater 20 for mobile device 50a. This exchange may also permit mobile device 50a to use repeaters 20 without being aware that such repeaters 20 are not base stations 32.

Once a repeater 20 or multiple repeaters 20 have been associated with mobile device 50a, mobile device 50a may begin performing and reporting measurements of signals received from these repeaters 20. For example, when mobile device 50a indicates to radio network controller 34 that mobile device 50a detects a particular repeater 20, radio network controller 34 may configure mobile device 50a to then report when the relevant repeater 20 has left the mobile device's reporting range. As a result, when mobile device 50a determines that the relevant repeater 20 has left its reporting range; mobile device 50a may report this event, or signal measurements indicating that this event has occurred, to radio network controller 34. Based on this report, radio network controller 34 may then update a list of repeaters 20 with which mobile device 50a is associated, such as by removing the relevant repeater 20 from the mobile device's active set. As a result, repeaters 20 may be added to mobile communication system 10 dynamically and incrementally, thereby permitting mobile communication system 10 to scale gradually and in a less expensive manner.

Additionally, once a repeater 20 is discovered by mobile device 50a, mobile device 50a may, in accordance with its configured selection procedure, select that repeater 20 for service as if the discovered repeater 20 were a base station 32. As a result, after receiving a pilot signal 70 and/or system information 72 from a particular repeater 20, mobile device 50a may attempt to establish a communication link with the discovered repeater 20. For example, if mobile device 50a determines that a newly-discovered repeater 20 currently provides the best signal for mobile device 50a, mobile device 50a may transmit an RRC Connection Request to the discovered repeater 20 requesting that an RRC Connection be established between mobile device 50a and the discovered repeater 20.

After a suitable communication link has been established between mobile device 50a and the relevant repeater 20, the relevant repeater 20 will repeat signals transmitted by mobile device 50a. As part of this process, the relevant repeater 20 receives signals from the connected mobile device 50a on a first antenna 22 and transmits the received signals to its serving base station 32 over a second antenna 24 using a communication link previously established with the serving base station 32. As noted above, repeaters 20 may retransmit received signals without introducing any gain or may scale or amplify received signals as appropriate before retransmission. Consequently, repeaters 20 may provide an inexpensive and flexible solution for increasing the coverage and throughput of mobile communication system 10

However, while repeaters 20 may improve the coverage and throughput of mobile communication system 10, repeaters 20 also expend energy when operational, even when not serving mobile devices 50. Furthermore, in particular embodiments, repeaters 20 repeat received noise in addition to signals received from mobile devices 50. Thus, if no mobile devices 50 or few mobile devices 50 would benefit from the repeating capabilities offered by a particular repeater 20, it may be advantageous to deactivate the relevant repeater 20. Similarly, when a mobile device 50 or a minimum number of mobile devices will benefit from a deactivated repeater 20 being operational, it may be desirable to activate or re-activate the relevant repeater 20.

Therefore, in particular embodiments, radio network controller 34 is configured to activate and deactivate a particular repeater 20, or otherwise adjust its operation, based on a determination of the current need for that repeater 20. In general, radio network controller 34 may be configured to transition a repeater 20 from a first operating state to a second operating state based on information received from a nearby mobile device 50. This information may relate to the signal strength of a particular repeater 20 (if active) as measured by the reporting mobile device 50, the signal strength of neighboring base stations 32 and repeaters 20 as measured by the reporting mobile device 50, the current location of the reporting mobile device 50 (e.g., its serving cell), or any suitable other information communicated by the reporting mobile device 50. Additionally, these first and second operating states may relate to any appropriate aspect of the operation of the relevant repeater 20 including, but not limited to, the on/off status of the repeater 20, its gain level, or its transmitting power.

As one specific example, repeaters 20 may be capable of operating in an idle mode or an active mode. When in the idle mode, repeaters 20 repeat signals received from mobile devices 50 using a first gain level. This first gain level may represent minimal or no gain. In particular embodiments, this first gain level may be set to approximately one in linear scale, meaning that repeaters 20 are forwarding but not amplifying signals received from mobile devices 50. In alternative embodiments, this first gain level may be set to zero in linear scale, meaning that repeaters are not retransmitting received signals, with or without gain. When in active mode, repeaters 20 repeat signals received from mobile devices 50 using a second gain level. This second gain level is higher than the first gain level.

In such embodiments, radio network controller 34 may be configured to transition a repeater 20 between a first state (i.e., the idle mode) and a second state (i.e., the active mode), based on the mobile devices 50 that have detected that repeater 20 or that should be able to detect that repeater 20. For example, radio network controller 34 may instruct a repeater 20 to transition from idle mode to active mode when a single mobile device 50 or a minimum number of mobile devices 50 enter a cell 60 associated with that repeater 20 or when an appropriate number of mobile devices 50 report that repeater 20 as part of their detected set. Radio network controller 34 may then instruct the relevant repeater 20 to transition from active mode back to idle mode when these conditions are no longer satisfied.

Additionally, in such embodiments, radio network controller 34 may be capable of signaling with repeaters 20 to configure either or both of the first and second gain levels, or to set ranges or limits for these levels. In particular embodiments, radio network controller 34 may inform a repeater 20 (such as repeater 20a shown in FIG. 1) of the uplink scrambling code used by a mobile device 50 (e.g., mobile device 50a) that has reported repeater 20a. Repeater 20a may then detect uplink signals transmitted by mobile device 50a and estimate the transmission power level of mobile device 50a. Repeater 20a may then adjust its gain level based on the transmission power level of mobile device 50a. For example, repeater 20a may set its gain level so that its repeated signals do not violate a maximum interference contribution ($I_{BS\_Max}$) when received at the serving base station 32 for repeater 20 (base station 32a in FIG. 1). In other words, repeater 20a may set its gain level ($G_R$) such that $G_R \leq (I_{BS\_Max}/C_{Mob}) - G_{BS}$, where $C_{Mob}$ is the transmission power level of mobile device 50a and $G_{BS}$ is the estimated attenuation between repeater 20a and serving base station 32a. If more than one mobile devices 50 are currently being repeated by repeater 20a, repeater 20a may adjust its gain level based on the maximum/minimum transmission power level, the average power level of the multiple mobile devices 50, or some other combination of the power levels of the multiple mobile devices 50.

As another specific example, radio network controller 34 may instruct repeater 20a to transition between a first state (e.g., an idle mode) and a second state (e.g., and active mode) based on whether any or an appropriate number of mobile devices 50 are reporting repeater 20a as the strongest signal received by those mobile devices 50. Depending on the configuration of mobile communication system 10, the determination may depend on whether repeater 20a is the strongest signal received from any base station 32 or repeater 20 or whether repeater 20a is simply the strongest signal received from any of repeaters 20. Once no mobile devices 50 or an insufficient number of mobile devices 50 report repeater 20a as the strongest signal received by those mobile devices 50, radio network controller 34 may instruct repeater 20a to transition back to the first state (e.g., to an inactive mode).

As an alternative, or in addition, to configuration performed by radio network controller 34, in particular embodiments, repeaters 20 may also be capable of self-configuration based on the present need for their repeating services. For example, radio network controller 34 may report to repeater 20a the uplink scrambling codes used by nearby mobile devices 50. Repeater 20a may then use the respective scrambling codes to determine if all of these mobile devices 50 are currently inactive or if an insufficient number of these mobile devices 50 are active. If so, repeater 20a may then transition from a first state (e.g., an idle state) to a second state (e.g., an active state) as described above.

Thus, mobile communication system 10 provides a flexible and efficient technique for discovery and management of repeaters 20 located within the service area of mobile communication system 10. Particular embodiments may enable repeaters 20 to be used with mobile devices 50 that are unable to distinguish repeaters 20 from base stations 32 and thus simplify backwards compatibility. Additionally, particular embodiments may provide a solution for managing repeaters 20 that can dynamically respond to the current need for repeaters 20 in a given location. As a result, particular embodiments of mobile communication system 10 provide several operational benefits. Specific embodiments however may provide some, none, or all of these benefits.

Figure 2:
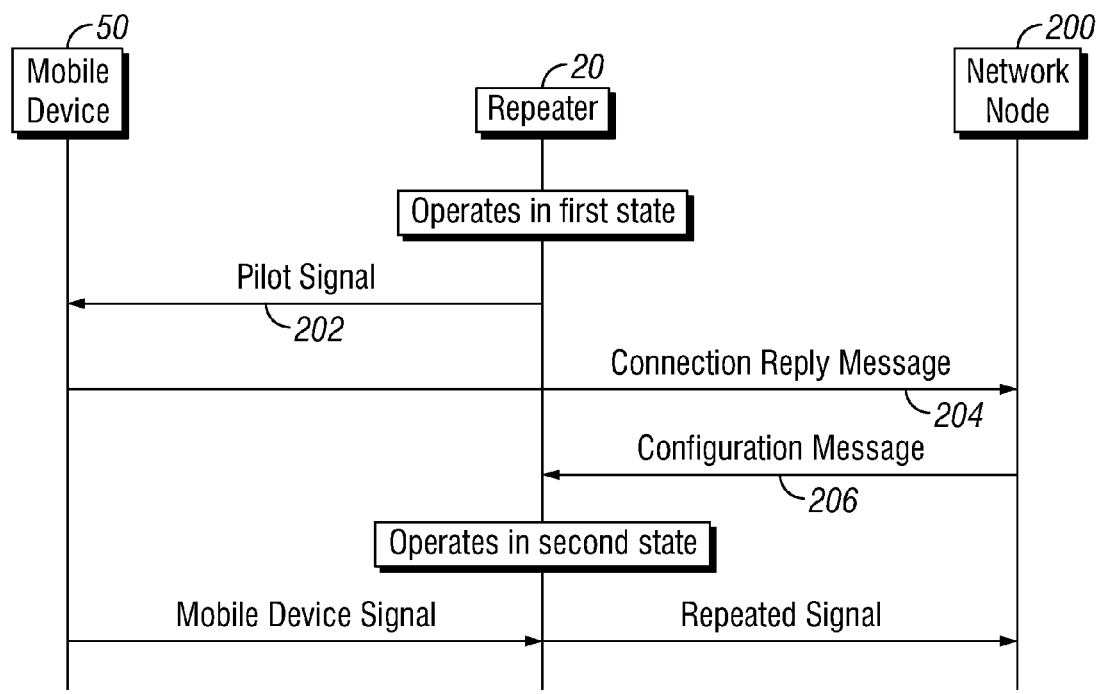
FIG. 2 is a signaling diagram showing further details of example interaction between various elements of the mobile communication system shown in FIG. 1.

FIG. 2 is a signaling diagram showing example interaction between components of mobile communication system 10 in which a repeater 20 moves from a first state to a second state due to a mobile device 50 being within range of repeater 20. Initially, repeater 20 is operating in a first state, in which repeater 20 is broadcasting a pilot signal 202. Mobile device 50 discovers the repeater pilot signal 202 and reports repeater pilot signal 202 (e.g., via a triggered measurement report 204) when repeater pilot signal 202 has met a triggering condition, for example, when the strength of received repeater pilot signal 202 is at least x dB (where x can be positive or negative) stronger than a strength of a received serving cell pilot signal. This informs access network node 200 (e.g., a radio controller 34) that repeater 20 is now useful for this mobile device 50, and therefore repeater 20 is reconfigured to operate in a second state. Furthermore, access network node 200 may provide repeater 20 with information such as an uplink scrambling code of repeated mobile device 50. As a result, it is possible that repeater 20 may detect mobile device 50 and react when mobile device 50 is beyond reach. In particular embodiments, access network node 200 may provide the scrambling codes and/or other configuration information by transmitting a configuration message 206 to repeater 20, as shown in FIG. 2.

Figure 3:
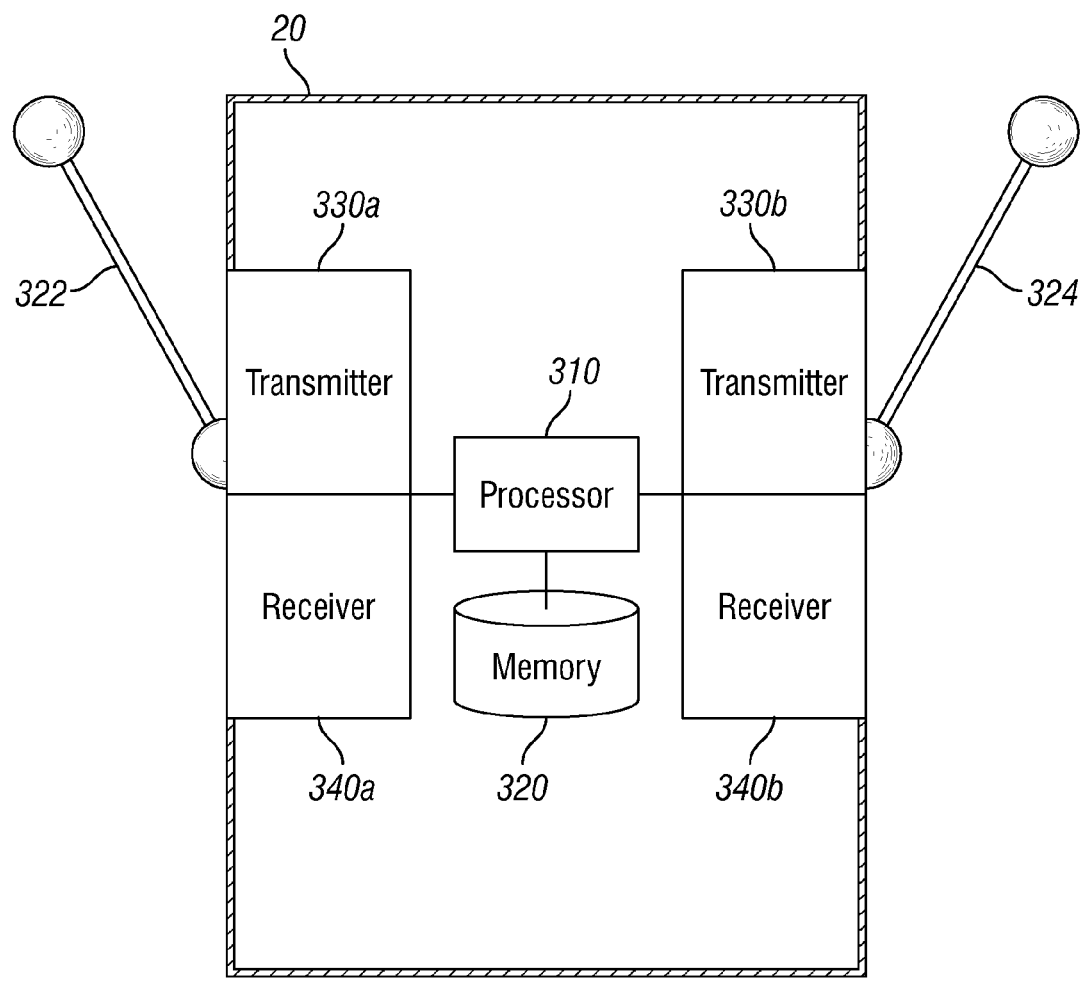
FIG. 3 is a block diagram illustrating a particular embodiment of the repeater shown in FIG. 1.

FIG. 3 is a block diagram illustrating in greater detail contents of a particular embodiment of a repeater 20. As shown in FIG. 3, the illustrated embodiment of repeater 20 includes a processor 310, a memory 320, a first antenna 322, a second antenna 324, a transmitter 330, and a receiver 340.

Processor 310 may represent or include any form of processing component, including dedicated microprocessors, general-purpose computers, or other devices capable of processing electronic information. Examples of processor 310 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of repeater 20 that includes a single processor 310, repeater 20 may include any number of processors 310 configured to interoperate in any appropriate manner.

Memory 320 stores processor instructions, pilot signals 70, system information 72, scrambling codes, gain levels, transmission power levels, and/or any other data utilized by repeater 20 during operation. Memory 320 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 3, memory 320 may include one or more physical components local to or remote from repeater 20.

Antennas 322 and 324 represent any suitable conductor capable of receiving and transmitting wireless signals. Transmitter 330a transmits RF signals over antenna 22, including repeated signals that are being retransmitted by repeater 20. Receiver 340a receives from antenna 322 signals transmitted by the serving base station 32, including configuration information and other data communicated by radio network controller 34. Transmitter 330b transmits RF signals over antenna 324, including pilot signal 70 and system information 72. Receiver 340b receives from antenna 24 certain RF signals transmitted by mobile devices 50, repeater 20 itself, and/or other sources. Although the example embodiment in FIG. 3 includes certain numbers of antennas, receivers, and transmitters, alternative embodiments of repeater 20 may include any suitable number of these components. For example, particular embodiments of repeater 20 may have more than two antennas. Similarly, transmitter 330a and receiver 340a may represent a single transceiver, as may transmitter 330b and receiver 340b.

Figure 4:
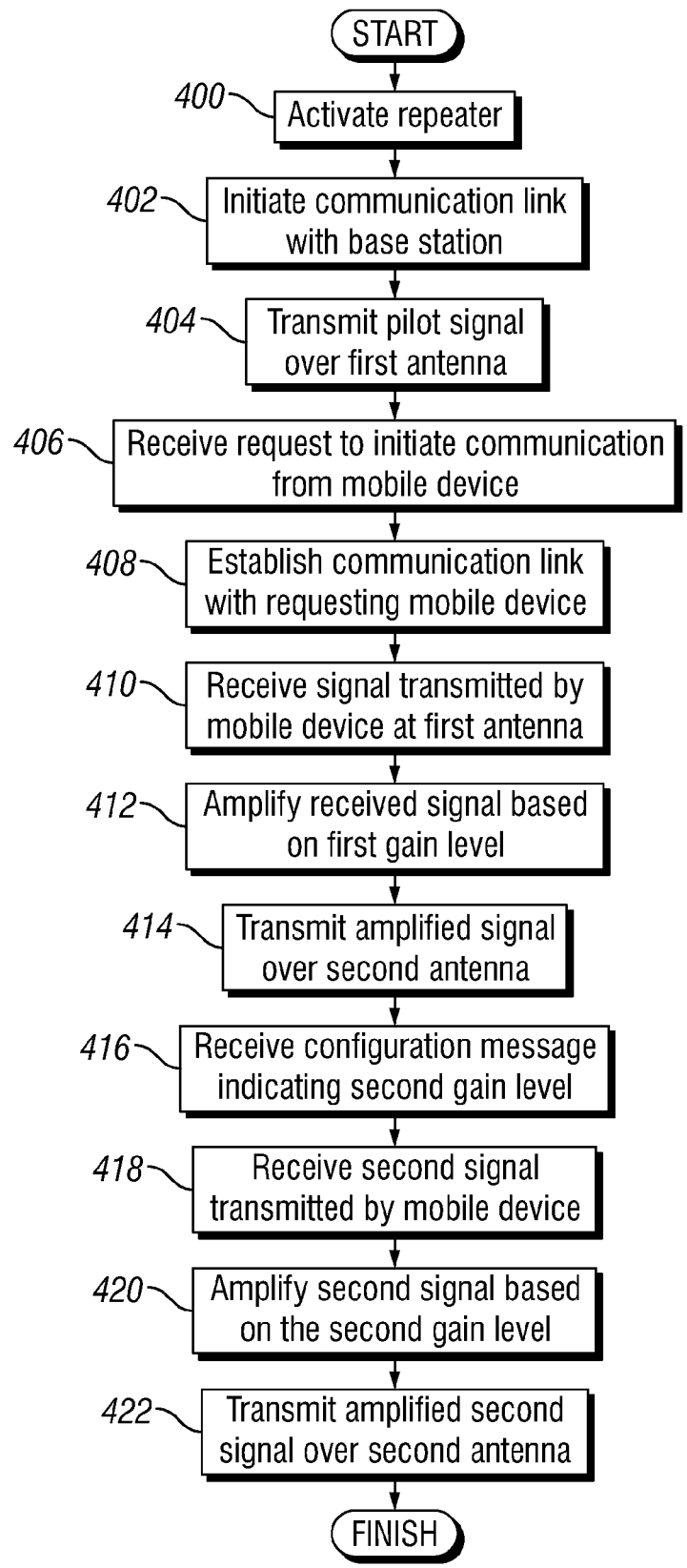
FIG. 4 is a flowchart illustrating example operation of a particular embodiment of the repeater in broadcasting information that permits mobile devices to communicate with the repeater.

FIG. 4 is a flowchart illustrating example operation of a particular embodiment of repeater 20. In particular, FIG. 4 illustrates operation of an embodiment of repeater 20 that broadcasts a pilot signal 70 that can be used by mobile devices 50 to identify repeater 20 to radio network controller 34. The steps illustrated in FIG. 4 may be combined, modified, or deleted where appropriate. Additional steps may also be added to the example operation. Furthermore, the described steps may be performed in any suitable order.

Operation begins at step 400 with repeater 20 being activated in a cell 60 of mobile communication system 10. Once operational, repeater 20 will, at step 402, initiate a communication link with a base station 32 serving the cell 60 in which repeater 20 is operating. As part of initiating this communication link, repeater 20 may transmit messages to an element, such as radio network controller 34, that is responsible for managing mobility and/or resource allocation in mobile communication system 10 (assumed for purposes of this example to be radio network controller 34). For example, in an embodiment implemented in a code division multiple access (CDMA) system, repeater 20 transmits an RRC Connection Request to the serving base station 32 as part of initiating a communication link. The serving base station 32 then forwards this RRC Connection Request to radio network controller 34.

After establishing a communication link with the serving base station 32, repeater 20 may then begin to repeat signals transmitted by mobile devices 50. To facilitate communication with mobile devices 50, repeater 20 transmits a pilot signal 70 over a first antenna 22 at step 404. Pilot signal 70 permits mobile devices 50 to identify repeater 20 to radio network controller 34. As noted above, certain embodiments of repeater 20 may also broadcast various types of system information 72 including, but not limited to, a system frame number (SFN); cell identity information; core network domain information (e.g., domain identifiers, domain-specific non-access stratum (NAS) information, location area codes (LACs), routing area codes (RACs)); cell selection and reselection parameters (e.g., minimum quality requirements, reselection thresholds, reselection timers, and maximum uplink transmit power); and various power control constraints. System information 72 may also include accessibility information such as allowed Public Land Mobile Network identities or an indication of whether the relevant repeater 20 is accepting traffic or not.

In particular embodiments, mobile devices 50 receiving the broadcasted pilot signal 70 may then report pilot signal 70 to radio network controller 34. For example, a mobile device 50 may report the pilot signal 70 as part of its detected set. In particular embodiments, radio network controller 34 may maintain a list of repeaters 20 served by radio network controller 34 and the pilot signal 70 broadcast by each. Consequently, the network node may then associate the relevant mobile device 50 with an identifier for the repeater 20 currently broadcasting the reported pilot signal 70. Radio network controller 34 may subsequent expect and/or request reports from the mobile device 50 when certain changes occur in the strength of signals received by the mobile device 50 from the repeater 20.

Depending on the strength of signals received from repeater 20, serving base station 32, and components in neighboring cells, mobile device 50 may subsequently select repeater 20 to serve mobile device 50. If mobile device 50 does select repeater 20, then mobile device 50 will attempt to connect to repeater 20 and repeater 20 will begin retransmitting signals received from mobile device 50. Steps 406-412 in FIG. 4 illustrate an example of this process.

Specifically, at step 406, repeater 20 receives a request to initiate communication from a mobile device 50 that has received the pilot signal. For example, in an embodiment implemented in a code division multiple access (CDMA) system, repeater 20 may receive, over a first antenna 22, an RRC Connection Request from a mobile device 50 that has received pilot signal 70 and/or system information 72 broadcast by repeater 20. In response to receiving the request to initiate communication, repeater 20 establishes a communication, link with the requesting mobile device 50 at step 408. Once the communication link is established, repeater 20 can begin repeating, on a second antenna 24, signals received from the requesting mobile device 50 on the first antenna 22. In FIG. 4, this process begins at step 410, with repeater 20 receiving, at first antenna 22, signals transmitted wirelessly by a mobile device 50. In particular embodiments, repeater 20 may amplify the signals received from the mobile device 50. In the described example, repeater 20 amplifies signals received from mobile device 50 based on a first gain level. As noted above, this gain level may represent any suitable gain level, including a zero gain under which repeater 20 is essentially configured not to retransmit signals received on first antenna 22. At step 412, repeater 20 then transmits the amplified signals over the second antenna 24 using the communication link established with the serving base station 32. In particular embodiments, repeater 20 is configured for in-band operation. Thus, in such embodiments, repeater 20 receives signals from mobile devices 50 over first antenna 22 at a first frequency and retransmits the received signals over second antenna 24 at the same frequency.

Based on the detection of pilot signal 70 by one or more mobile devices 50 or on measurements performed on pilot signal 70 by such mobile devices 50, radio network controller 34 may decide to change the configuration of repeater 20. In particular, radio network controller 34 may decide to transition repeater 20 from a first state to a second state. For example, in the example described by FIG. 4, radio network controller 34 decides to change a gain level of repeater 20 as a result of a particular number of mobile devices 50 detecting pilot signal 70 transmitted by repeater 20. Thus, at step 414, repeater 20 receives a configuration message from radio network controller 34 indicating a second gain level.

Repeater 20 will then begin retransmitting signals received from mobile device 50 using this second gain level. In FIG. 4, this process begins at step 416, with repeater 20 receiving, at first antenna 22, a second signal transmitted wirelessly by a mobile device 50. At step 418, repeater 20 amplifies this second signal based on the second gain level indicated by the received configuration message. At step 420, repeater 20 then transmits the amplified second signal over the second antenna 24 using the communication link established with the serving base station 32. Operation of the described embodiment of repeater 20 may then continue indefinitely or terminate as shown in FIG. 4.

Figure 5:
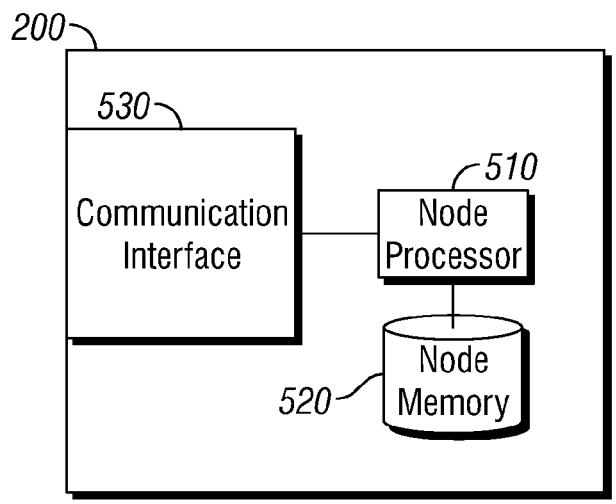
FIG. 5 is a block diagram illustrating a particular embodiment of a network node capable of managing operation of particular embodiments of the repeater.

FIG. 5 is a block diagram illustrating in greater detail contents of a particular embodiment of a network node 200 that may be used to configure repeater 20 in particular embodiments of mobile communication system 10. Network node 200 may be any appropriate element of mobile communication system 10: In particular embodiments, such as the one illustrated in FIG. 1, network node 200 represents a radio network controller. As shown in FIG. 5, the illustrated embodiment of network node 200 includes a node processor 510, a node memory 520, and a communication interface 530.

Node processor 510 may represent or include any form of processing component, including dedicated microprocessors, general-purpose computers, or other devices capable of processing electronic information. Examples of node processor 510 include field-programmable gate arrays (FPGAs), programmable microprocessors, digital signal processors (DSPs), application-specific integrated circuits (ASICs), and any other suitable specific- or general-purpose processors. Although FIG. 5 illustrates, for the sake of simplicity, an embodiment of network node 200 that includes a single node processor 510, network node 200 may include any number of node processors 510 configured to interoperate in any appropriate manner.

Node memory 520 stores processor instructions, lists associating mobile devices 50 with repeaters 20 and base stations 32, gain levels or transmission power levels for repeaters 20, and/or any other data utilized by network node 200 during operation. Memory 520 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 5, memory 520 may include one or more physical components local to or remote from network node 200.

Communication interface 530 comprises electronic circuitry and other components suitable to permit network node 200 to communicate with repeater 20 directly or indirectly. For example, in embodiments in which network node 200 represents a node separate from the radio elements of access network 30 (e.g., a radio network controller) communication interface 530 may represent circuitry capable of communicating over a wireline connection between network node 200 and the radio elements of access network 30 (e.g., circuitry capable of establishing and utilizing tub and lur interfaces for communication with base stations 32 and other radio network controllers 34, respectively). In such embodiments, network node 200 may use communication interface 530 to transmit information for repeater 20 to radio elements (such as base stations 32) that are capable of communicating wirelessly with repeaters 20. As an alternative example, in embodiments in which network node 200 itself represents a radio element (such as an enhanced Node B (eNodeB) in a Long Term Evolution (LTE) system), communication interface 530 may instead include circuitry and components capable of communicating with repeater 20 over a wireless connection, such as an antenna and radiofrequency transmitter.

Figure 6:
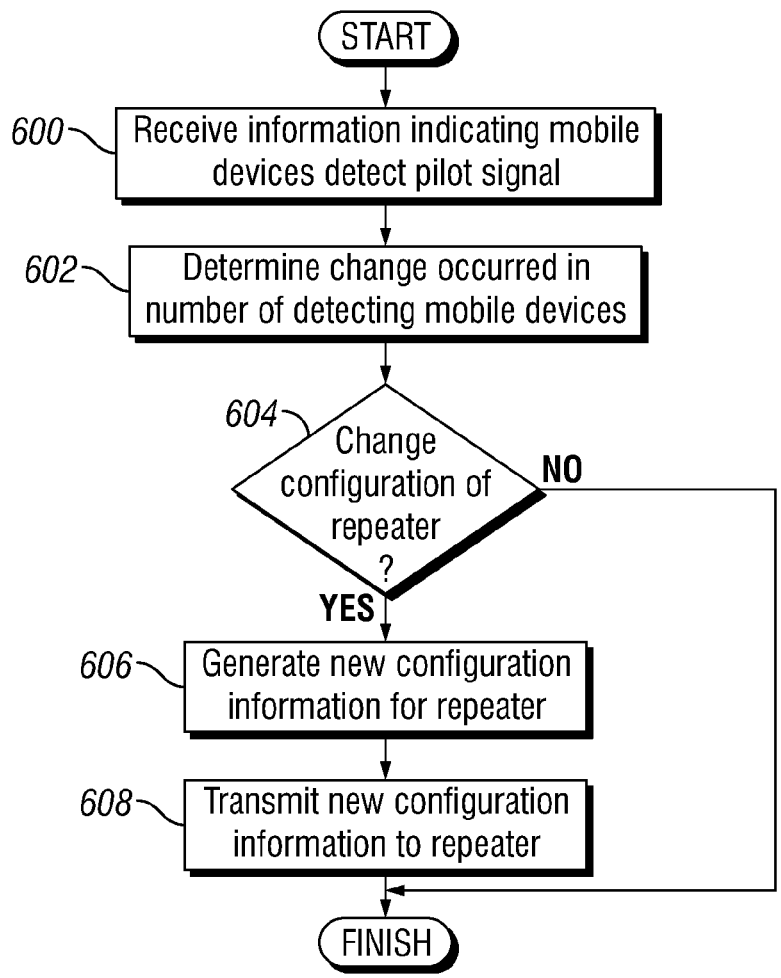
FIG. 6 is a flowchart illustrating example operation of a particular embodiment of the network node described in FIG. 5.

FIG. 6 is a flowchart illustrating operation of network node 200 in managing a repeater 20. In particular, FIG. 6 describes operation of an embodiment of network node 200 that is capable of changing the configuration of repeater 20 based on information received from mobile devices 50 that have detected pilot signal 70 transmitted by repeater 20. The relevant network node may represent any appropriate element of mobile communication system 10, including but not limited to, a radio network controller 34 or eNodeB. The steps illustrated in FIG. 6 may be combined, modified, or deleted where appropriate. Additional steps may also be added to the example operation. Furthermore, the described steps may be performed in any suitable order.

Operation begins at step 600 with network node 200 receiving information from one or more mobile devices 50 indicating that those mobile devices 50 detect a pilot signal transmitted by repeater 20. As one example, in particular embodiments, network node may receive a report from a mobile device 50 indicating that the reporting mobile device 50 has begun detecting a particular pilot signal 70 or indicating a signal strength associated with a particular pilot signal 70. As another example, in particular embodiments, network node 200 may receive a report from a mobile device 50 that identifies all base stations 32 and repeaters 20 for which the reporting mobile device 50 is currently detecting pilot signals 70. As yet another embodiment, network node 200 may receive information indicating that the reporting mobile device 50 has entered or exited a particular cell 60 that the network node knows is served by the relevant repeater 20.

Based on the received information, network node 200 determines at step 602 that a change has occurred in the number of mobile devices 50 that are receiving pilot signal 70 broadcast by repeater 20. This determination may comprise receiving information indicating, directly or indirectly, a change has occurred in the number of mobile devices 50 in the area. Additionally, as part of determining that a change has occurred, network node 200 may determine that the relevant repeater 20 is no longer associated in a particular manner with a threshold number of mobile devices 50. For example, network node 200 may determine that repeater 20 is now, or no longer, included in the active set, monitored set, and/or detected set of a threshold number of mobile devices. In general, network node 200 may determine the change has occurred in any suitable manner using any appropriate information.

In response to the change in the number of mobile devices in the area served by repeater 20, network node 200 decides based on the current number of mobile devices 50 in the served area whether to change the configuration of repeater 20 at step 604. If the network node decides to change the configuration of repeater 20, the network node instructs repeater 20 to change its configuration. For example, in the described embodiment, network node 200 generates new configuration information, at step 606, for repeater 20 based on the number of mobile devices 50 associated with repeater 20. This new configuration information indicates a change in configuration to be implemented by repeater 20. At step 608, network node 200 transmits the new configuration information to repeater 20 (e.g., in the form of a configuration message that indicates the new configuration). As explained above, the change in configuration may represent a transition from a first operating state to a second operating state and may relate to any appropriate aspect of the repeater's operation including, but not limited to, an on/off status, a gain level, or a transmission power level. Operation of the described embodiment of network node 200 may then continue indefinitely or terminate as shown in FIG. 6.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of operating a repeater for wireless communication, the method comprising:
   broadcasting, from a repeater, a pilot signal in a service area associated with the repeater, wherein the pilot signal carries a scrambling code that permits mobile terminals to decode information transmitted by the repeater;
   receiving a request to initiate communication from a mobile terminal that has received the pilot signal;
   in response to receiving the request, establishing a communication link with the mobile terminal;
   receiving, at a first antenna of the repeater, data transmitted wirelessly by the mobile terminal; and
   transmitting, over a second antenna of the repeater, the received data to a base station.

2. The method of claim 1, wherein:
   receiving the data transmitted wirelessly by the mobile terminal comprises receiving the data transmitted wirelessly on a first frequency; and
   transmitting the received data to the base station comprises transmitting the received data to the base station on the first frequency.

3. The method of claim 1, further comprising broadcasting, from the repeater, system information, wherein the system information comprises information that permits mobile terminals to initiate communication with the repeater, and wherein receiving data transmitted by the mobile terminal comprises receiving data transmitted by the mobile terminal in accordance with the system information.

4. The method of claim 1, wherein receiving the request to initiate communication from the mobile terminal comprises:
   receiving information instructing the repeater to enter an active state from a network node associated with a mobile terminal that has received the pilot signal;
   in response to receiving the information, entering an active state; and
   after entering the active state, receiving the request to initiate communication from the mobile terminal.

5. The method of claim 4, wherein the network node associated with the mobile terminal comprises a radio network controller (RNC) serving the mobile terminal.

6. The method of claim 1, wherein transmitting the received data to a base station comprises:
   amplifying the received data by a first gain level; and
   transmitting the amplified data to the base station.

7. The method of claim 6, further comprising:
   receiving configuration information from a network node associated with a mobile terminal that has received the pilot signal, wherein the configuration information instructs the repeater to adjust a gain level associated with the repeater; and
   after receiving the information from the network node, amplifying data received from the mobile terminal by a second gain level.

8. An apparatus for repeating wireless communication, the apparatus comprising:
   a first antenna;
   a transmitter operable to transmit signals on the first antenna;
   a second antenna;
   a receiver operable to receive signals through the second antenna; and
   a processor operable to:
      instruct the transmitter to broadcast a pilot signal in a service area associated with the apparatus, wherein the pilot signal carries a scrambling code that permits mobile terminals to decode information transmitted by the apparatus;
      receive a request to initiate communication from a mobile terminal that has received the pilot signal;
      in response to receiving the request, establish a communication link with the mobile terminal;
      receive, over the first antenna, data transmitted wirelessly by the mobile terminal; and
      instruct the transmitter to transmit, over the second antenna, the received data to a base station.

9. The apparatus of claim 8, wherein the processor is operable to:
   receive, over the first antenna, the data transmitted wirelessly by the mobile terminal on a first frequency; and
   instruct the transmitter to transmit, over the second antenna, the received data on the first frequency to the base station.

10. The apparatus of claim 8, wherein the processor is further operable to instruct the transmitter to broadcast system information, wherein the system information comprises information that permits mobile terminals to initiate communication with the apparatus, and wherein the processor is operable to receive data transmitted by the mobile terminal in accordance with the system information.

11. The apparatus of claim 8, wherein the processor is operable to receive the request to initiate communication from the mobile terminal by:
   receiving information instructing the apparatus to enter an active state from a network node associated with a mobile terminal that has received the pilot signal;
   in response to receiving the information, entering an active state; and
   after entering the active state, receiving the request to initiate communication from the mobile terminal.

12. The apparatus of claim 11, wherein the network node comprises a radio network controller (RNC) serving the mobile terminal.

13. The apparatus of claim 8, wherein the processor is operable to instruct the transmitter to transmit the received data to the base station by:
   amplifying the received data by a first gain level; and
   instructing the transmitter to transmit the amplified data to the base station.

14. The apparatus of claim 13, wherein the processor is further operable to further:
   receive, over the second antenna, configuration information from a network node associated with a mobile terminal that has received the pilot signal, wherein the configuration information instructs the apparatus to adjust a gain level associated with the apparatus; and
   after receiving the information from the network node, amplify data received from the mobile terminal by a second gain level.

15. A method of operating a repeater for wireless communication, the method comprising:
   broadcasting, from a repeater, a pilot signal in a service area associated with the repeater, wherein the pilot signal carries a scrambling code that permits mobile terminals to decode information transmitted by the repeater;
   receiving a request to initiate communication from a mobile terminal that has received the pilot signal;
   in response to receiving the request, establishing a communication link with the mobile terminal;

receiving, at a first antenna of the repeater, data transmitted wirelessly by the mobile terminal; and transmitting, over a second antenna of the repeater, the received data to a base station;

wherein transmitting the received data to a base station comprises:

amplifying the received data by a first gain level, and transmitting the amplified data to the base station; and wherein the method further comprises:

receiving configuration information from a network node associated with a mobile terminal that has received the pilot signal, wherein the configuration information instructs the repeater to adjust a gain level associated with the repeater; and after receiving the information from the network node, amplifying data received from the mobile terminal by a second gain level.

* * * * *

UNITED STATES PATENT AND TRADEMARK OFFICE
CERTIFICATE OF CORRECTION

| | |
|---|---|
| PATENT NO. | : 9,083,434 B2 |
| APPLICATION NO. | : 13/238769 |
| DATED | : July 14, 2015 |
| INVENTOR(S) | : Gunnarsson et al. |

It is certified that error appears in the above-identified patent and that said Letters Patent is hereby corrected as shown below:

In the Drawings

In Fig. 1, Sheet 1 of 5, below figure, insert -- FIG. 1 --.

In the Specification

In Column 7, Line 50, delete "range;" and insert -- range, --, therefor.

In Column 9, Line 13, delete "hack" and insert -- back --, therefor.

In Column 12, Lines 26-27, delete "communication," and insert -- communication --, therefor.

In Column 13, Line 10, delete "10:" and insert -- 10. --, therefor.

In Column 13, Line 49, delete "tub and lur" and insert -- lub and lur --, therefor.

Signed and Sealed this
Sixteenth Day of February, 2016

Michelle K. Lee
*Director of the United States Patent and Trademark Office*